United States Patent
Miyachi et al.

(10) Patent No.: US 8,241,730 B2
(45) Date of Patent: Aug. 14, 2012

(54) AUTOMOBILE RESIN PANEL AND MANUFACTURING METHOD THEREFOR

(75) Inventors: Toshiki Miyachi, Hiroshima (JP); Shinji Gasami, Hiroshima (JP)

(73) Assignee: Daikyo Nishikawa Corporation (JP)

( * ) Notice: Subject to any disclaimer, the term of this patent is extended or adjusted under 35 U.S.C. 154(b) by 889 days.

(21) Appl. No.: 11/518,906

(22) Filed: Sep. 12, 2006

(65) Prior Publication Data

US 2007/0065632 A1 Mar. 22, 2007

(30) Foreign Application Priority Data

Sep. 22, 2005 (JP) ................... 2005-276177

(51) Int. Cl.
 *B32B 3/30* (2006.01)
 *B32B 3/26* (2006.01)
(52) U.S. Cl. ...... 428/163; 428/167; 428/158; 428/304.4
(58) Field of Classification Search .................. 428/156, 428/158, 161, 163, 167, 172
See application file for complete search history.

(56) References Cited

U.S. PATENT DOCUMENTS

| | | | | |
|---|---|---|---|---|
| 3,791,912 A | * | 2/1974 | Allard | 428/159 |
| 4,584,230 A | * | 4/1986 | Saegusa | 428/218 |
| 2002/0005644 A1 | | 1/2002 | Tamada et al. | |
| 2002/0094428 A1 | | 7/2002 | Nomura et al. | |

FOREIGN PATENT DOCUMENTS

| | | |
|---|---|---|
| JP | H8-207129 A | 8/1996 |
| JP | 2538513 B | 4/1997 |
| JP | H9-155957 A | 6/1997 |
| JP | H10-280668 A | 10/1998 |
| JP | H11-156881 A | 6/1999 |
| JP | H11-179751 A | 7/1999 |
| JP | 2001-010542 A | 1/2001 |
| JP | 2002-029339 A | 1/2002 |

OTHER PUBLICATIONS

Japanese Office Action "Notice of Reasons for Rejection" with mailing date of Dec. 14, 2010; Japanese Patent Application No. 2005-276177 with translation.

* cited by examiner

*Primary Examiner* — David R Sample
*Assistant Examiner* — Prashant J Khatri
(74) *Attorney, Agent, or Firm* — Studebaker & Brackett PC; Donald R. Studebaker

(57) ABSTRACT

A skin layer is formed on sides of a resin panel along the direction of the panel thickness and both surfaces of the resin panel substantially orthogonal to the sides. An expanded layer is formed in an inner part of the panel surrounded by the skin layer to have a multiplicity of voids. Inner ribs are formed of solid layers in the expanded layer to extend along the surfaces and the direction of the panel thickness so that both the longitudinal ends of each inner rib continue out to the skin layer at the opposed sides. Reinforcing members are inserted into the inner ribs respectively, to expose both the longitudinal end surfaces thereof from the opposed sides. Both the longitudinal end surfaces of each reinforcing member are formed with engaging holes releasably engageable with a support member for supporting the reinforcing member in the cavity of the mold assembly.

1 Claim, 11 Drawing Sheets

AUTOMOBILE RESIN PANEL AND MANUFACTURING METHOD THEREFOR

CROSS-REFERENCES TO RELATED APPLICATION

This application claims priority under 35 USC 119 to Japanese Patent Application No. 2005-276177 filed on Sep. 22, 2005, the entire contents of which are incorporated herein by reference.

BACKGROUND OF THE INVENTION (1) Field of the Invention

This invention relates to improvements in a resin panel in which a skin layer is formed on its surface and an expanded layer having a multiplicity of voids are formed inside it and improvements in a method for manufacturing the resin panel.

(2) Description of the Related Art

Registered Japanese Utility-Model Publication No. 2538513 (hereinafter, referred to as Patent Document 1) discloses a technique of forming a resin panel having hollows inside it by blow molding and thereby saving its weight. In the case of this resin panel, the opposed panel surfaces are deformed to form cylindrical support parts therebetween by pressing a parison from both sides with halves of a mold assembly in blow molding and, after the removal of the resin panel from the mold assembly, metal pipes are pressed in the support parts, respectively, to provide rigidity.

In the resin panel disclosed in Patent Document 1, however, the contours of the support parts for supporting the metal pipes pressed in them are exposed as recesses at the external surface of the resin panel, which disfigures the appearance of the resin panel. Further, since the panel inside is formed not of an expanded layer having a multiplicity of voids but of hollows, deformations such as warpages occur on the surfaces, which further deteriorates the resin panel appearance. Furthermore, since the press-in of the metal pipes are carried out after blow molding, a loose press-in would cause the metal pipe to drop out of or rattle against the cylindrical support part. If the resin panel in this state is applied to a motor vehicle, vibration sounds might be produced. In order to eliminate these drawbacks, the resin panel must be molded with high precision. This increases the number of manufacturing steps.

SUMMARY OF THE INVENTION

The present invention has been made with the foregoing in mind and, therefore, its object is to improve the appearance of a resin panel and reduce the number of steps for manufacturing it while providing its weight reduction and sufficient rigidity.

To attain the above object, the present invention is characterized by employing expansion molding instead of blow molding.

Specifically, the present invention is directed to a resin panel including: a skin layer formed of a solid layer on sides thereof along a direction of the panel thickness and both surfaces thereof substantially orthogonal to the sides; and an expanded layer formed in an inner part thereof surrounded by the skin layer to have a multiplicity of voids by enlarging the volume of the cavity of a mold assembly during molding of the molding of the resin panel to expand a thermoplastic resin in the cavity and also directed to a method for manufacturing the resin panel. In the present invention, the following solutions are taken.

A first solution of the invention is directed to the resin panel and characterized in that an elongate inner rib is formed of a solid layer in the expanded layer to extend along the panel surfaces and the direction of the panel thickness, at least one longitudinal end of the inner rib continuing out to the skin layer at one of the panel sides, an elongate reinforcing member is inserted in the inner rib in the course of molding of the resin panel, at least part of at least one longitudinal end surface of the reinforcing member being exposed from said one of the panel sides, and the exposed part of the reinforcing member at the one longitudinal end surface is formed with an engaging part releasably engageable with a support member for supporting the reinforcing member in the cavity of the mold assembly during molding of the resin panel.

A second solution of the invention is directed to the method for manufacturing the resin panel and characterized by comprising: closing the mold assembly and supporting the reinforcing member in the cavity using the support member by releasably engaging the engaging part of the reinforcing member with the support member; then injecting a thermoplastic resin into the cavity to fill the cavity and enlarging the volume of the cavity in the course of solidification of the thermoplastic resin in the cavity to expand the thermoplastic resin; and then releasing the support member from the engaging part of the reinforcing member.

According to the first solution of the invention, since the inner part of the resin panel surrounded by the skin layer is formed into an expanded layer having a multiplicity of voids, this reduces the weight of the resin panel. Further, since the expanded layer includes inner ribs in which reinforcing members are inserted so that at least one ends of them continue out to the skin layer at one of the panel sides, the resin panel is increased in rigidity as compared to the resin panel in Patent Document 1 whose inner part is formed of hollows. Furthermore, since the inner ribs are in the expanded layer where they have no effect on the external surface of the resin panel and the expanded layer has a multiplicity of voids, this improves the appearance of the resin panel surfaces. Furthermore, since the reinforcing members are inserted into the inner ribs in the course of molding of the resin panel, the number of manufacturing steps can be reduced as compared to the technique in Patent Document 1 in which metal pipes are pressed into cylindrical support parts after the molding.

According to the second solution of the invention, if only the reinforcing members are supported in the cavity of the mold assembly by the support members, the thermoplastic resin is injected into the cavity to fill it, the cavity volume is enlarged and the support members are then retracted, a resin panel having a light weight, sufficient rigidity and improved appearance can be easily produced in a small number of manufacturing steps.

DETAILED DESCRIPTION OF THE INVENTION

Hereinafter, embodiments of the present invention will be described with reference to the drawings.
Embodiment 1

Figure 8:
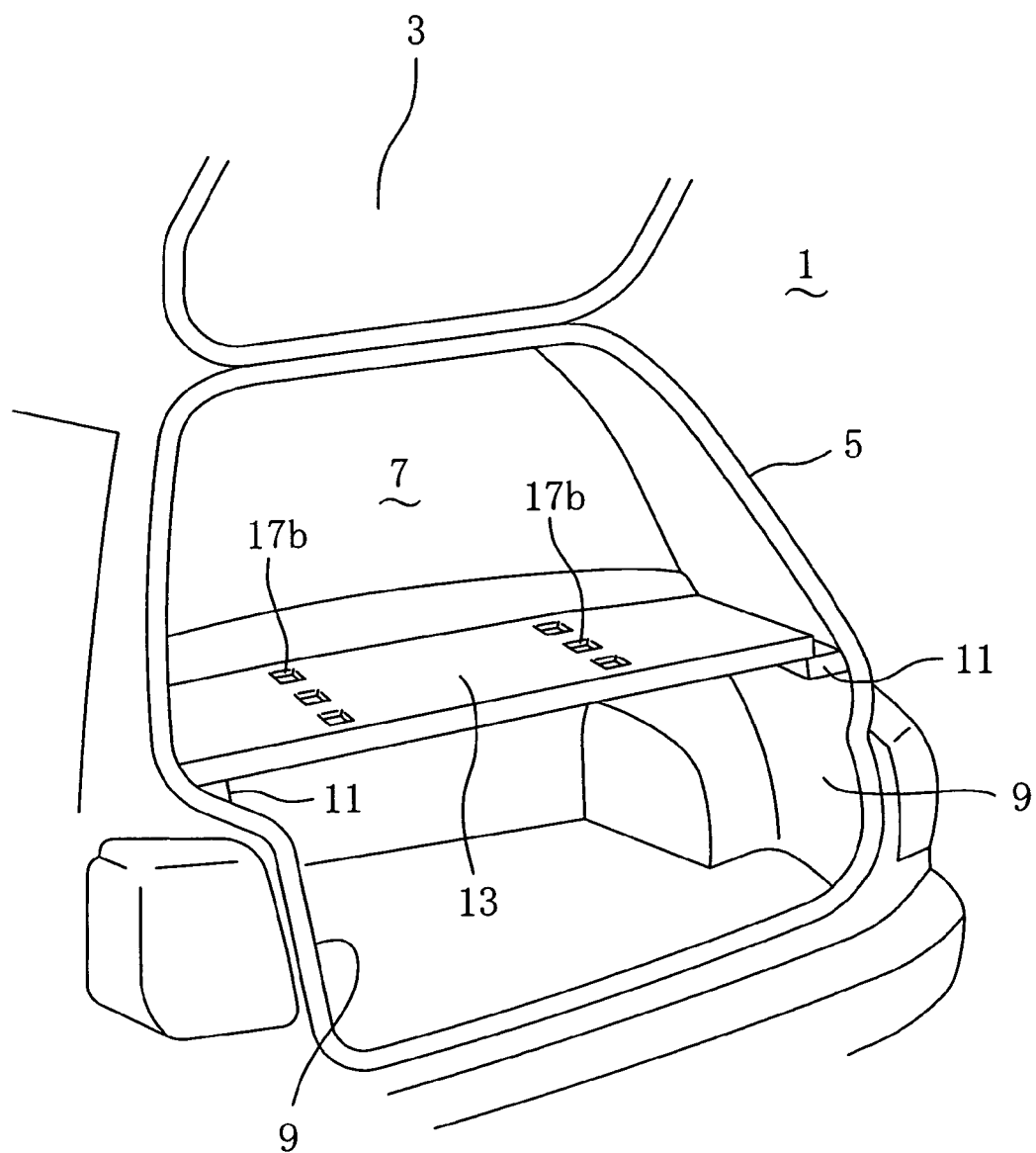
FIG. 8 is a perspective view of a trunk in the rear part of a hatchback car when the present invention is applied to a package tray for the car.

FIG. 8 shows a state that a back door 3 of a hatchback car 1 is opened upward to leave a trunk 7 in the rear part of a car body 5 open. Trunk-side trims 9, 9 are disposed on both sides of the trunk 7 in the car width direction. A substantially rectangular package tray 13 is detachably placed as a resin panel according to the present invention on supports 11, 11 formed on the trunk-side trims 9, 9, respectively, to partition the trunk 7 into upper and lower spaces.

Figure 1:
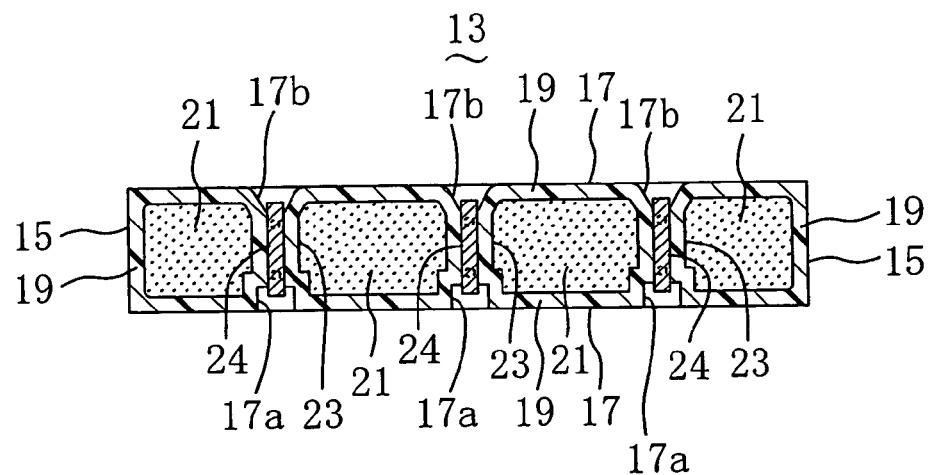
FIG. 1 is a cross-sectional view taken along the line I-I in FIG. 2.
Figure 2:
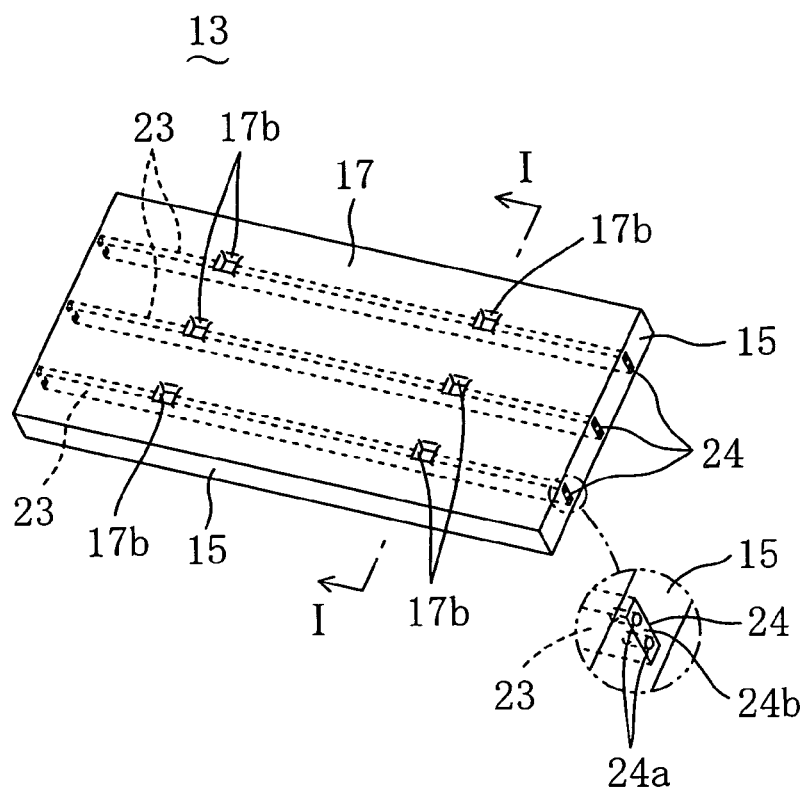
FIG. 2 is a perspective view of a package tray according to Embodiment 1 of the invention.

As shown in FIGS. 1 and 2, the package tray 13 according to Embodiment 1 of the invention includes a skin layer 19 formed of a solid layer on its four sides 15 along the thickness direction and both surfaces 17 substantially orthogonal to the four sides 15. The package tray 13 also includes an expanded layer 21 formed in its inner part surrounded by the skin layer 19 to have a multiplicity of voids (not shown) by enlarging the volume of the cavity of a mold assembly during molding to expand a thermoplastic resin R (see FIG. 4) fed in the cavity. Though not shown in the figures, fibers such as glass fibers are mixed into the thermoplastic resin R.

In the expanded layer 21, three elongate inner ribs 23 formed of solid layers are formed integral and continuous with portions of the skin layer 19 located at the opposed surfaces 17 to extend along the surfaces 17 and the thickness direction of the package tray 13 so that both longitudinal ends of each inner rib 23 are integral and continuous with portions of the skin layer 19 located at two opposed sides 15. Further, elongate, rectangular plate-shaped reinforcing members 24 made of metal or high rigidity resin are inserted into the inner ribs 23, respectively, in the course of molding of the package tray 13 to expose both longitudinal ends thereof from the two opposed sides 15. Furthermore, in each of the longitudinal end surfaces 24b of the reinforcing member 24, engaging holes 24a are formed as engaging part releasably engageable with a support member 31 for supporting the reinforcing member 24 in the cavity 35 of the mold assembly 29 during molding. Furthermore, in the opposed surfaces 17, holes 17a ..., 17b ... are formed in spots to reach the reinforcing members 24 by after-mentioned molding retention parts 27b for supporting the reinforcing members 24 during molding of the package tray 13. Out of the holes 17a ... and 17b ..., the holes 17a ... located in the surface of the package tray 13 opposite to the direction of expansion of the thermoplastic resin R (in the lower surface thereof in FIG. 1) are each formed in a rectangular shape conforming to the shape of the molding retention part 27b. On the other hand, the holes 17b ... located in the other surface of the package tray 13 in the direction of expansion of the thermoplastic resin R (in the upper surface thereof in FIG. 1) each have tapered side surfaces. This is because the former is engaged with the associated molding retention part 27b until the removal of the expansion-molded package tray 13 from the mold assembly 29 and the latter is released from the associated molding retention part 27b during expansion molding before the complete solidification of the skin layer 19 and thereby slightly loses its shape.

Since the expanded layer 21 having a multiplicity of voids is thus formed in the inner part of the package tray 13 surrounded by the skin layer 19, this provides weight reduction of the package tray 13. Further, since the expanded layer 21 includes inner ribs 23 in which reinforcing members 24 are inserted so that their both ends continue out to the skin layer 19 at two opposed sides 15 of the package tray 13, the package tray 13 can be increased in rigidity as compared to the resin panel in Patent Document 1 whose inner part is formed of hollows. Furthermore, since the inner ribs 23 are in the expanded layer 21 where they have no effect on the external surface of the package tray 13 and the expanded layer 21 has a multiplicity of voids, this improves the appearance of the package tray 13. Furthermore, since the reinforcing members 24 are inserted into the inner ribs 23 in the course of molding of the package tray 13, molding precision can be eased and the number of manufacturing steps can be reduced as compared to the technique in Patent Document 1 in which metal pipes are pressed in after the molding.

Next, a description is given of a manufacturing method for the package tray 13 as described above.

In manufacturing the package tray 13, as shown in FIGS. 3 to 6, a mold assembly 29 is prepared that includes a stationary mold 25 having a concavity 25a and a movable mold 27 accommodated in the concavity 25a of the stationary mold 25 for advance and retraction. In each of two opposed side walls 25b defining the concavity 25a of the stationary mold 25, three through holes 25c (only one shown in the figures) are formed towards the bottom of the concavity 25a at spaced intervals to extend in the car front-to-rear direction (the right-to-left direction in the figures) and along the surfaces 17. Retractably inserted in the three through holes 25c are rectangular plate-shaped support members 31, respectively, each having two engagement pins 31a formed on the forward end (see FIG. 7). The three support members 31 are connected through a connecting member 33 to an unshown hydraulic cylinder and configured to enter into and retract from the associated side wall 25b of the stationary mold 25 by extension and retraction of the hydraulic cylinder. In molding, the mold assembly 29 is closed and each reinforcing member 24 is supported in the cavity 35 using the opposed support members 31 by releasably engaging the engaging holes 24a of the reinforcing member 24 with the engagement pins 31a of the support members 31. The stationary mold 25 is formed with a resin passage 25d through which the thermoplastic resin R can be injected from an unshown injector into the cavity 35. The molding surface of the movable mold 27 is formed with three rectangular valleys 27a (only one shown in FIG. 3A). From each rectangular valley 27a and the opposed portion of the stationary mold 25, boss-shaped molding retention parts 27b are raised into the cavity 35 at points spaced in the longitudinal direction of the reinforcing member 24 (the right-to-left direction in FIG. 3A) so that two from the rectangular valley 27a are opposed to two from the stationary mold 25, respectively. Each molding retention part 27b has a guide groove 27c formed at its distal end and is configured to move the reinforcing member 24 back and forth with the reinforcing member 24 held engaged in the guide groove 27c.

Though in this embodiment the molding retention parts 27b are oppositely disposed between the stationary mold 25 and the movable mold 27, they may not be opposed but may be offset from each other in the longitudinal direction of the reinforcing member 24. Further, the molding retention parts 27b may be formed on either one of the stationary mold 25 and the movable mold 27. The number of molding retention parts 27b formed may be selected appropriately according to the length of the reinforcing member 24. For the sake of convenience, in FIGS. 3 to 6, the distance between the opposed side walls 25b of the stationary mold 25 is expressed to be shorter than the length of the package tray 13 expressed in FIG. 2. The same is applied to the below described Embodiment 3.

<Manufacturing Method>

Figure 3A:
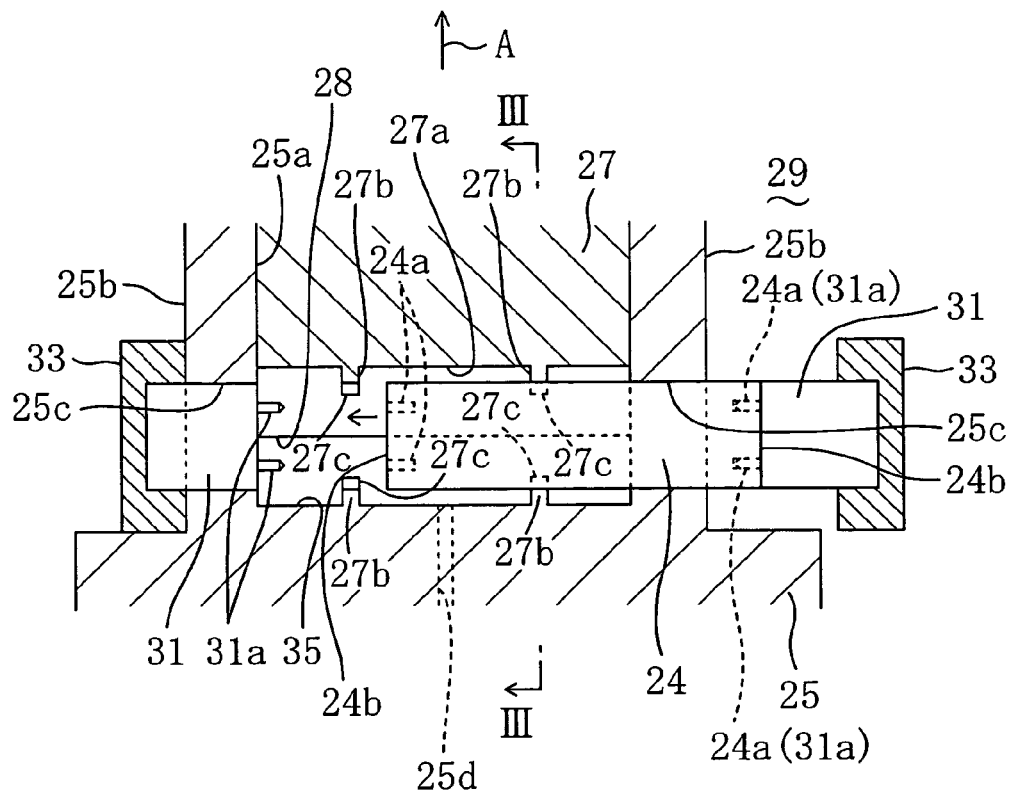
FIG. 3A is a cross-sectional view of a mold assembly in one step of a manufacturing method for the package tray according to Embodiment 1 in which a reinforcing member supported by support members is being inserted in the cavity of the mold assembly and FIG. 3B is a cross-sectional view taken along the line III-III in FIG. 3A.
Figure 3B:
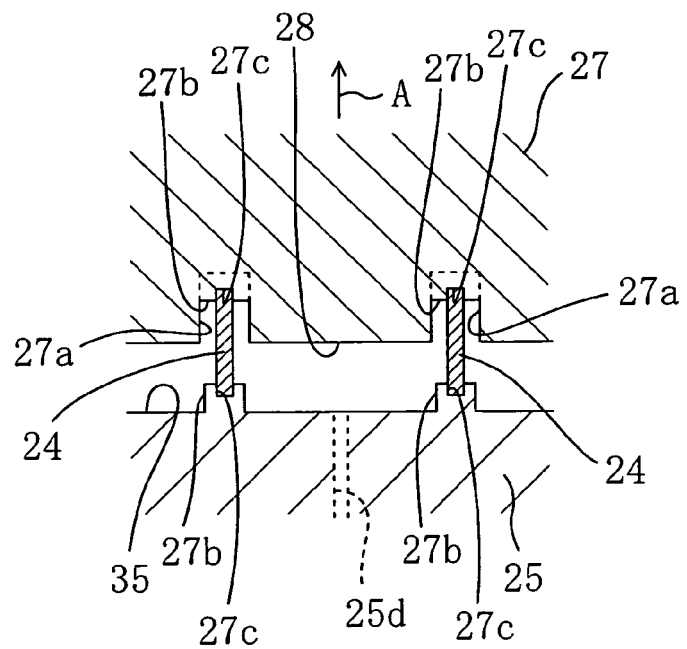

First, as shown in FIG. 3, the movable mold 27 is advanced down to close the mold assembly 29. Before or after the mold closing, the three reinforcing members 24, which are previously supported to one set of support members 31 on one side of the mold assembly 29 by the engagement between the engagement pins 31a of the support members 31 and the engaging holes 24a of the reinforcing members 24, are entered into the cavity 35 through the through holes 25c, respectively, in the one side wall 25b of the stationary mold 25 by the extension of the hydraulic cylinder (not shown). In the other side wall 25b of the stationary mold 25, the other set of support members 31 on the other side of the mold assembly 29 are inserted in the through holes 25c and stand by.

Figure 4A:
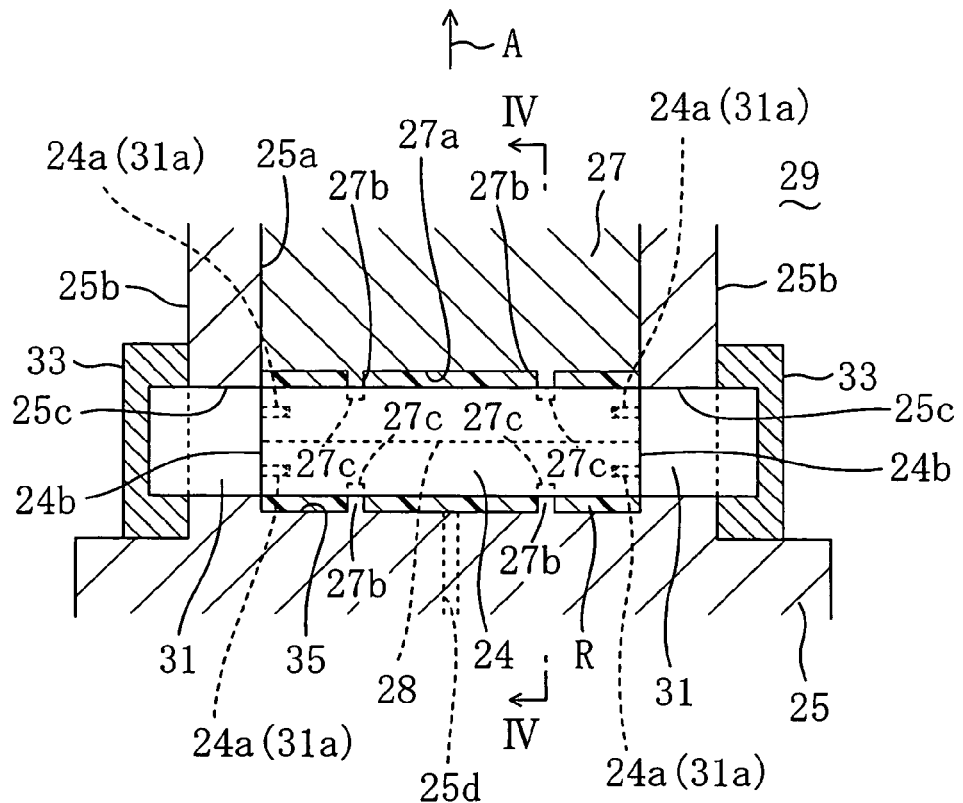
FIG. 4A is a cross-sectional view of the mold assembly in another step of the manufacturing method in which a thermoplastic resin is injected in the cavity of the mold assembly of FIG. 3 to fill it and FIG. 4B is a cross-sectional view taken along the line IV-IV in FIG. 4A.
Figure 4B:
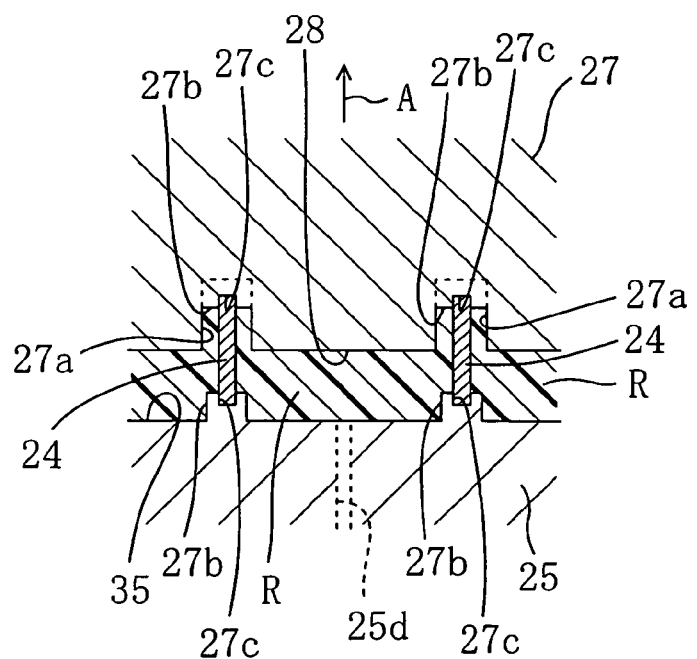

Subsequently, the engaging holes 24a in the forward ends of the three reinforcing members 24 are engaged on the engagement pins 31a of the other set of support members 31 so that the reinforcing members 24 are supported in the cavity 35 by all of the support members 31. Then, as shown in FIG. 4, a thermoplastic resin R containing fibers such as glass fibers (for example, fiber-contained polypropylene resin) is injected from the injector (not shown) through the resin passage 25b into the cavity 35 to fill the cavity 35.

Figure 5A:
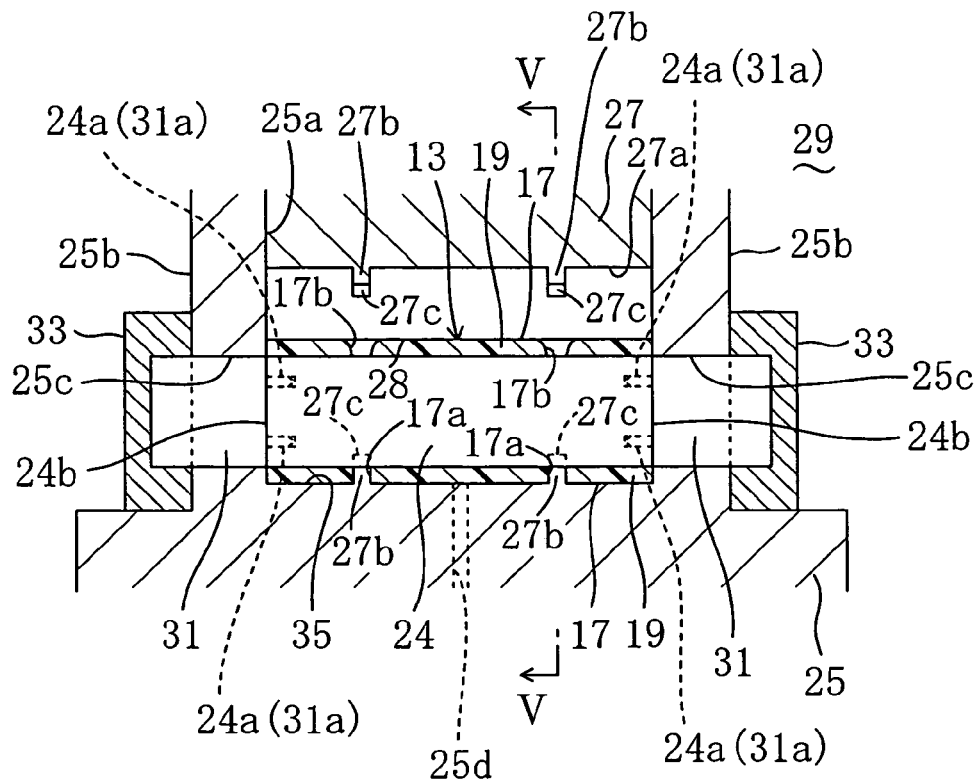
FIG. 5A is a cross-sectional view of the mold assembly in still another step of the manufacturing method in which a movable mold of the mold assembly of FIG. 4 is retracted and a package tray is molded in the cavity and FIG. 5B is a cross-sectional view taken along the line V-V in FIG. 5A.
Figure 5B:
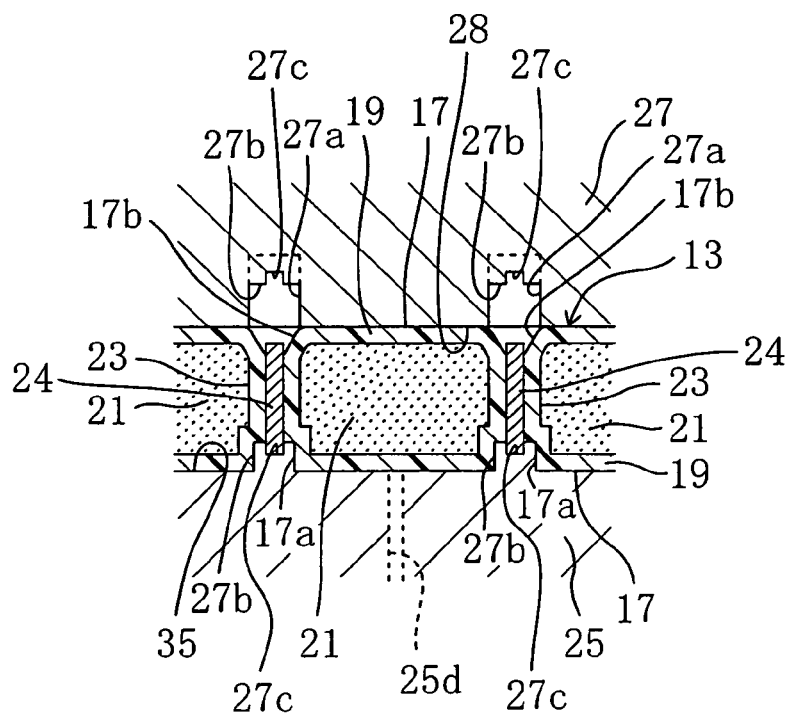

Thereafter, in the course of solidification of the thermoplastic resin R in the cavity 35 of the mold assembly 29, specifically, when a skin layer 19 is formed in a portion of the thermoplastic resin R located in the vicinity of the molding surfaces of the mold assembly 29 in the cavity 35 and the inside of the thermoplastic resin R is still in gel form, as shown in FIG. 5, the movable mold 27 is retracted in the mold opening direction A by a distance corresponding to a thickness of the skin layer 19 located at the surfaces 17 to enlarge the cavity volume, thereby expanding the thermoplastic resin R. During the expansion, the molding retention parts 27b of the stationary mold 25 are kept holding the reinforcing members 24, whereas the molding retention parts 27b of the movable mold 27 are released from the reinforcing members 24 and not kept holding them.

Thus, a portion of the thermoplastic resin R in contact with the molding surfaces of the mold assembly 29 is early cooled owing to the mold temperature so that a skin layer 19 formed of a solid layer having high resin density is formed on the sides 15 and surfaces 17. In addition, inner ribs 23 formed of solid layers having high resin density are formed likewise in portions of the thermoplastic resin R in contact with the outer surfaces of the reinforcing members 24. On the other hand, the inside of the thermoplastic resin R is insusceptible to the mold temperature and in a gel form having high viscosity. Therefore, when the cavity volume is enlarged, fibers (not shown) having been compressed by the mold assembly 29 up to that time are relieved of the compression and elastically restore. This elastic restoring force (spring-back action), i.e., the expansion pressure, causes the thermoplastic resin R to expand, thereby providing a package tray 13 in which an expanded layer 21 having a multiplicity of voids and lower resin density than the skin layer 19 is formed in the inner part thereof surrounded by the skin layer 19. In the expanded layer 21 of the package tray 13 thus molded, three inner ribs 23 of solid layers extending along the surfaces 17 are formed so that both the longitudinal ends thereof integrally continue out to the skin layer 19 at the two opposed sides 15 and both ends thereof in the thickness direction of the package tray 13 integrally continue out to the skin layer 19 at the surfaces 17. Inserted in the inner ribs 23 are the reinforcing members 24, respectively, with their engaging holes 24a in both longitudinal end surfaces 24 exposed from the two opposed sides 15.

Figure 6A:
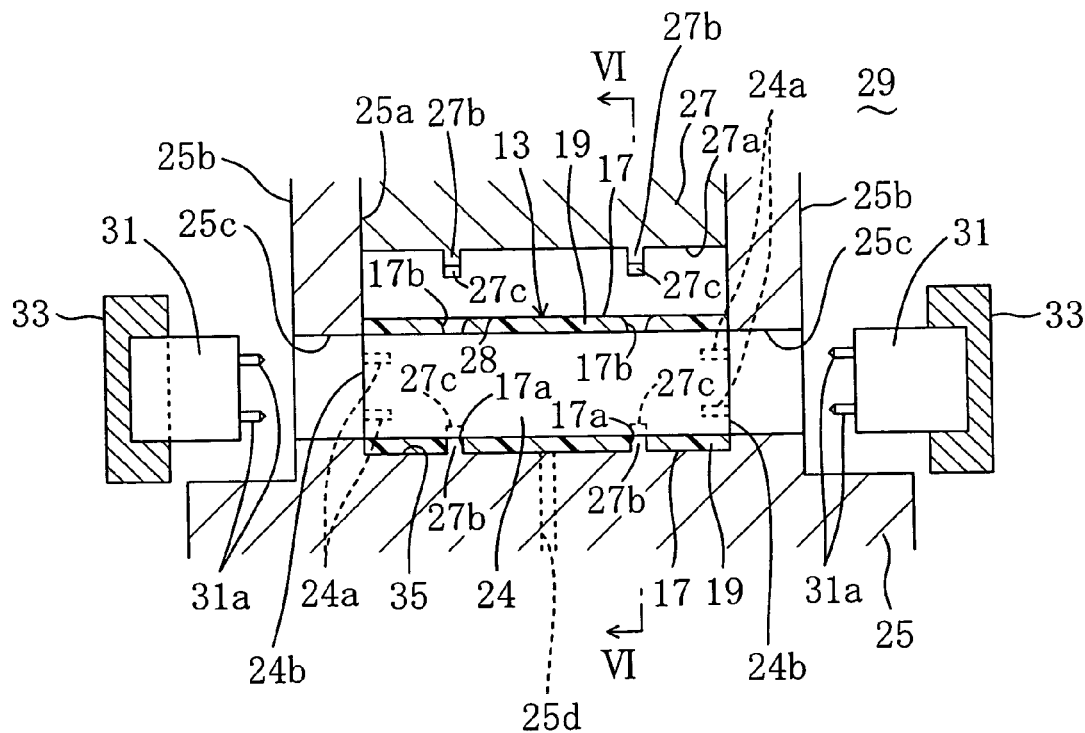
FIG. 6A is a cross-sectional view of the mold assembly in still another step of the manufacturing method in which the support members are retracted after the molding of the package tray in the mold assembly of FIG. 5
Figure 6B:
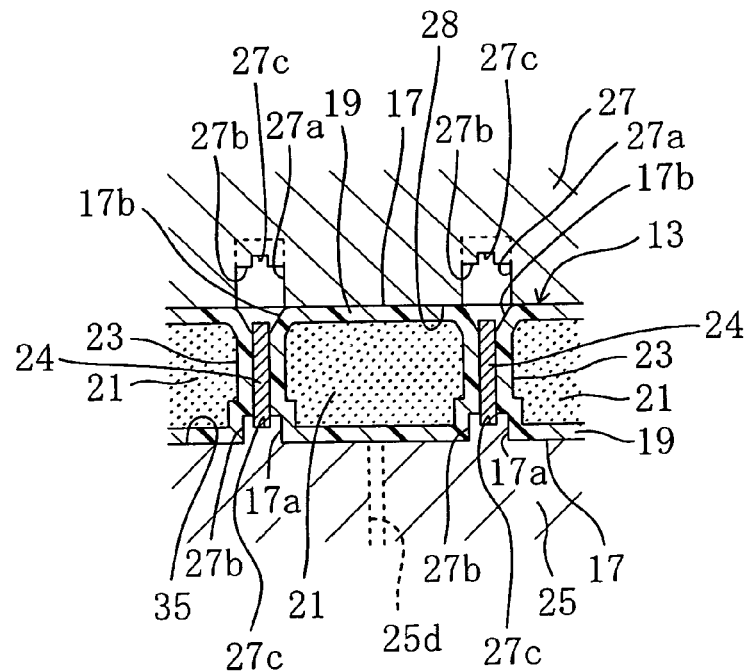
FIG. 6B is a cross-sectional view taken along the line VI-VI in FIG. 6A.
Figure 7:
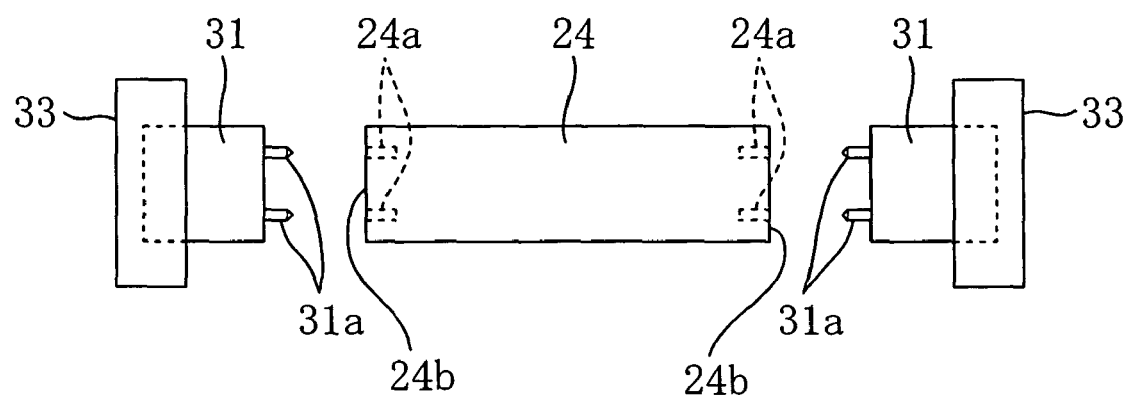
FIG. 7 is a front view of the reinforcing member and the support members when the former is separated from the latter.

Then, at the stage where the package tray 13 has sufficiently solidified in the cavity 35 of the mold assembly 29, as shown in FIG. 6A, the support members 31 are retracted by the retraction of the hydraulic cylinders to release them from the engaging holes 24a of the reinforcing members 24. Subsequently, the movable mold 27 is further retracted and the package tray 13 is removed from the mold assembly 29.

As described so far, if only the reinforcing members 24 are supported in the cavity 35 of the mold assembly 29 by the support members 31, the thermoplastic resin R is injected into the cavity 35 to fill it, the cavity volume is enlarged and the support members 31 are then retracted, a package tray 13 having a light weight, sufficient rigidity and improved appearance can be easily produced in a small number of manufacturing steps.

Further, since the reinforcing members 24 are inserted into the inner ribs 23 during molding of the package tray 13, this eases the molding precision in providing the reinforcing members 24 in the package tray 13.

Furthermore, since the reinforcing members 24 are entered into the mold assembly 29 while being held by the molding retention parts 27b, this avoids trembling of the reinforcing members 24 when entered therein, avoids displacement of the reinforcing members 24 due to the injection pressure during the injection of the thermoplastic resin R into the cavity 35 after the mold closing and allows the inner ribs 23 in which the reinforcing members 24 are inserted to be easily formed in proper positions without displacement.

Embodiment 2

Figure 9:
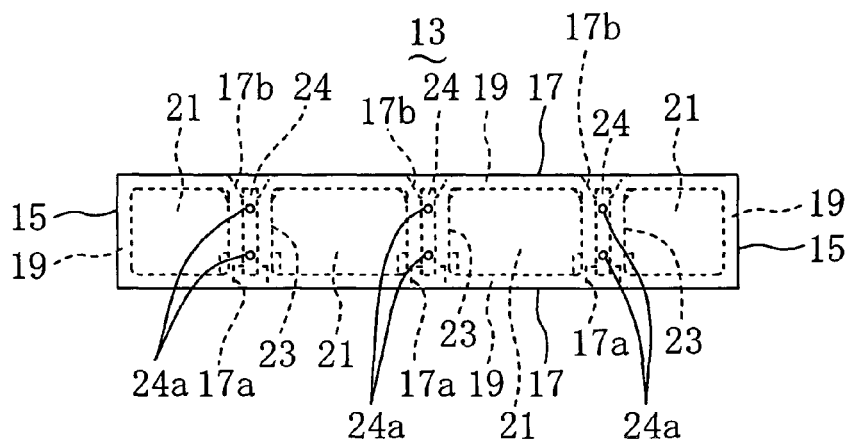
FIG. 9 is a side view of a short side of a package tray according to Embodiment 2 of the invention.
Figure 10:
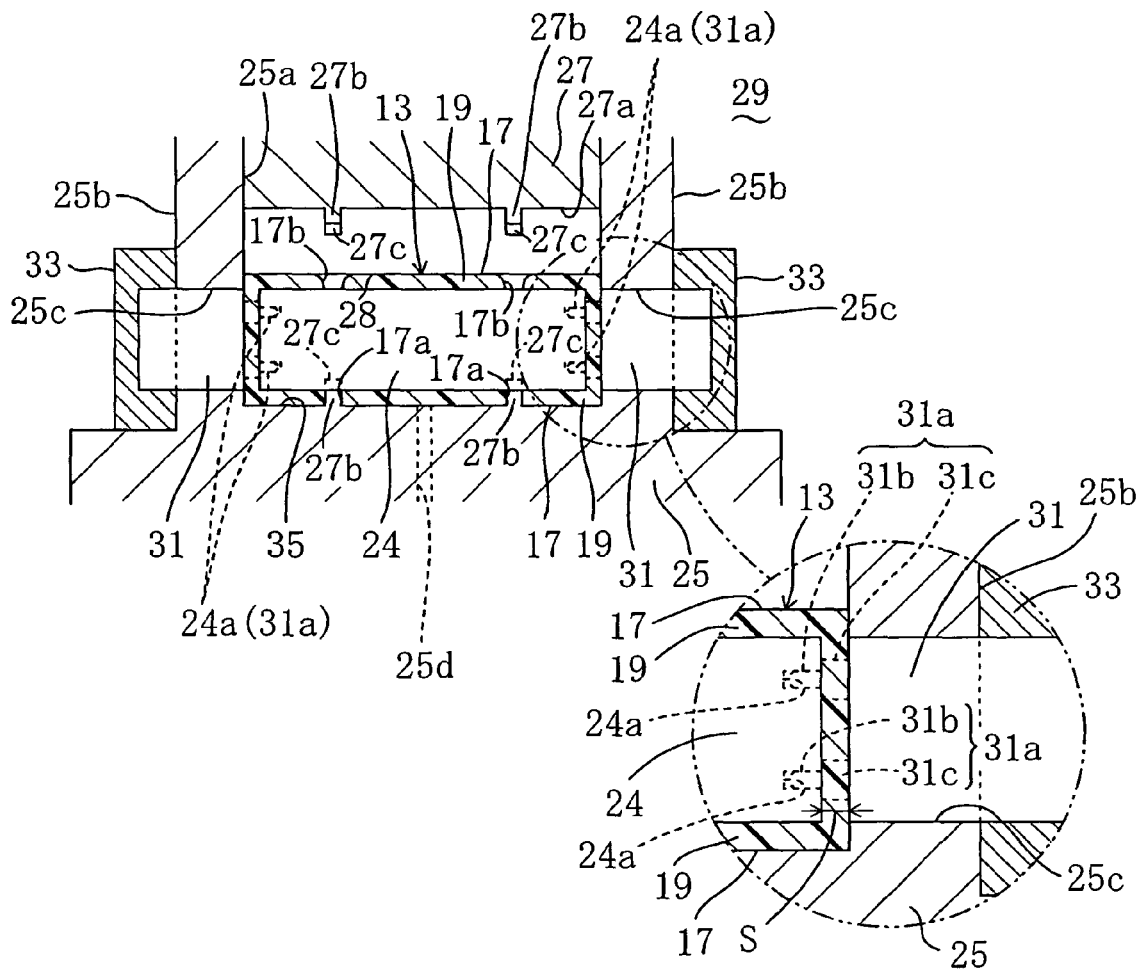
FIG. 10 is a corresponding view of FIG. 5A illustrating a mold assembly according to Embodiment 2.

FIG. 9 is a side view of a short side of a rectangular package tray 13 according to Embodiment 2 and FIG. 10 is a cross-sectional view of a mold assembly in a step of a package tray manufacturing method in which the movable mold 27 is retracted and the package tray 13 is molded (a corresponding view of FIG. 5A). In Embodiment 2, the longitudinal end surfaces 24b of the three reinforcing members 24 are covered with the skin layer 19 except for the engaging holes 24a, namely, only portions of the end surfaces 24b of the reinforcing members 24 (portions thereof in which the engaging holes 24a are formed) are exposed from the sides 15. This improves the appearance of the sides 15. The package tray 13 of this type is molded by forming the reinforcing member 24 in a slightly smaller length to create a clearance S between its each end and the inner surface of the associated side wall 25b (the concavity 25a) of the stationary mold 25 and elongating the engagement pins 31a of the supporting members 31 accordingly. The creation of the clearance S is implemented by forming the engagement pin 31a in a shouldered form composed of a small-diameter distal end part 31b and a large-diameter proximal end part 31c and bringing the end surface 24b of the reinforcing member 24 into abutment on the end surfaces of the large-diameter proximal end parts 31c with the small-diameter distal end parts 31b of the engagement pins 31a engaged in the engaging holes 24a of the reinforcing member 24. The other details are the same as in Embodiment 1 and, therefore, a description is not given of the structure and manufacturing method of the package tray 13.

Embodiment 3

Figure 11:
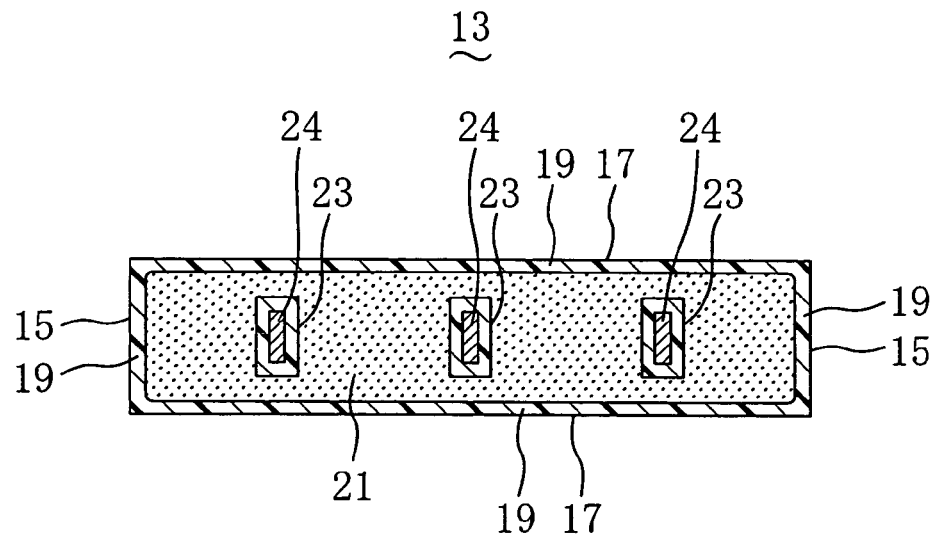
FIG. 11 is a cross-sectional view taken along the line XI-XI in FIG. 12.
Figure 12:
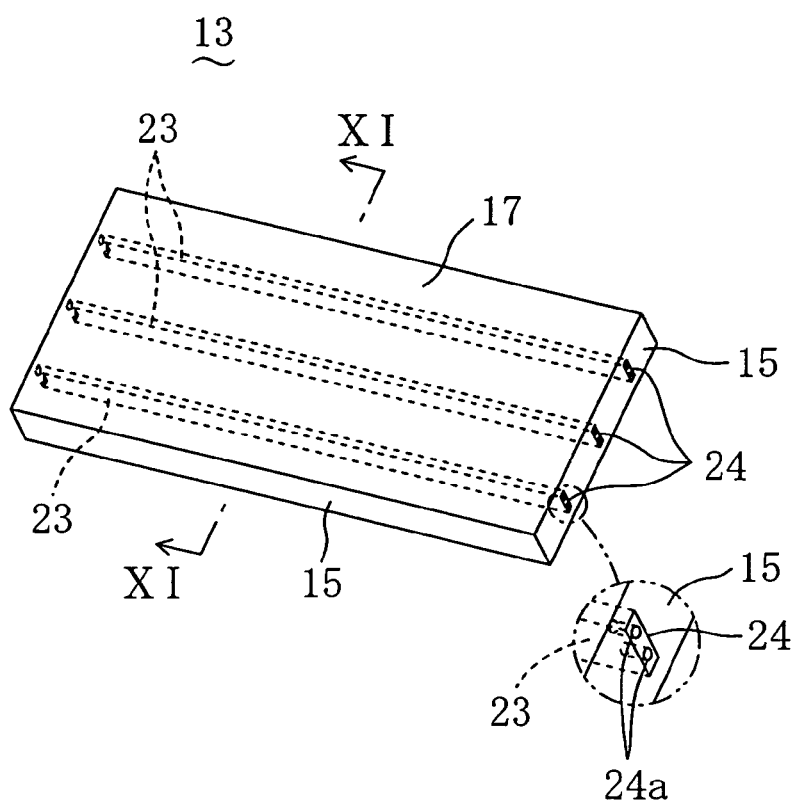
FIG. 12 is a perspective view of a package tray according to Embodiment 3 of the invention.
Figure 13A:
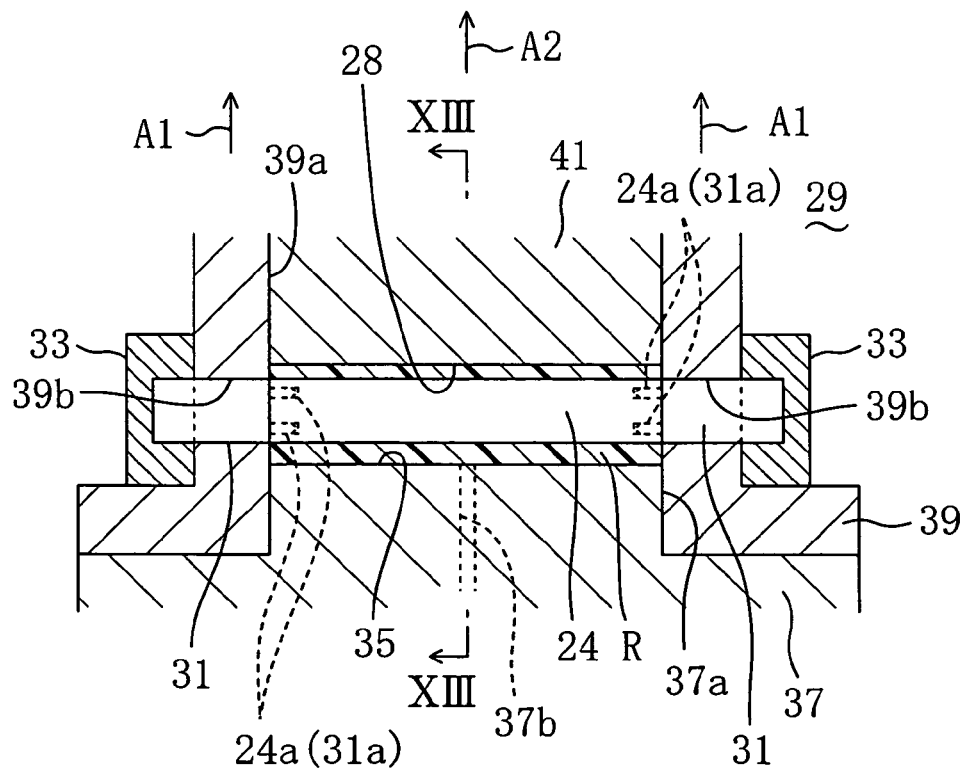
FIG. 13A is a corresponding view of FIG. 4A illustrating a mold assembly according to Embodiment 3 and FIG. 13B is a cross-sectional view taken along the line XIII-XIII in FIG. 13A.
Figure 13B:
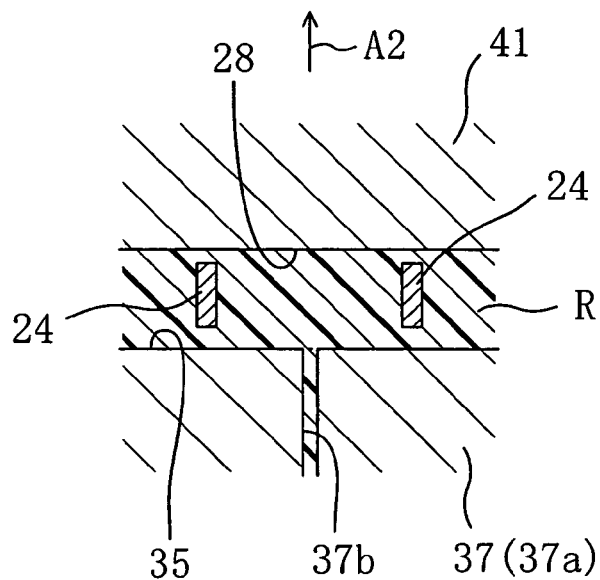
Figure 14A:
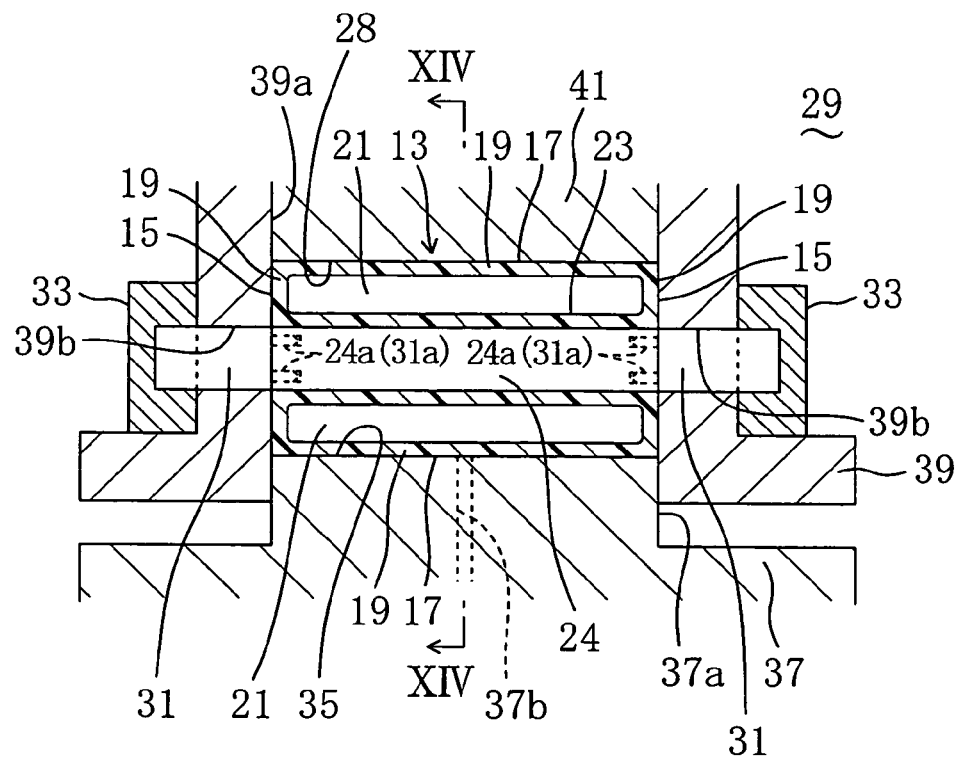
FIG. 14A is a cross-sectional view of the mold assembly in one step of a manufacturing method for the package tray according to Embodiment 3 in which first and second movable molds are retracted and a package tray is molded in the cavity of the mold assembly and FIG. 14B is a cross-sectional view taken along the line XIV-XIV in FIG. 14A.
Figure 14B:
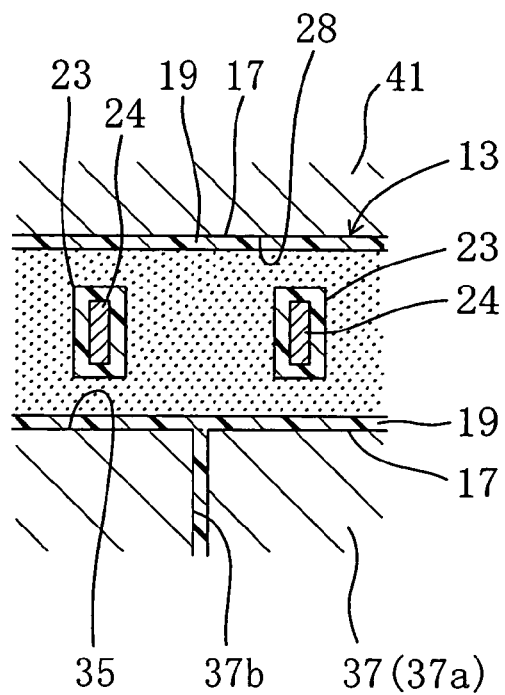

FIGS. 11 and 12 show a package tray 13 according to Embodiment 3 and FIGS. 13 and 14 show cross-sectional views of a mold assembly in different manufacturing steps for the package tray 13. Embodiment 3 is different from Embodiment 1 in that three inner ribs 23 are located substantially in the middle of the panel thickness and that the opposed surfaces 17, 17 has no holes 17a, . . . , 17b, . . . but is equal in the other essential structures. Therefore, the same components are indicated by the same reference numerals and a detailed description thereof is not given.

Further, in the mold assembly 29, the stationary mold 25 used in Embodiment 1 is separated in upper and lower parts, the lower part serves as a stationary mold 37 and the upper part serves as a first movable mold 39. The movable mold 37 used in Embodiment 1 is referred to as a second movable mold 41. The upper end of the stationary mold 37 is formed into a raised part 37a. The first movable mold 39 is formed with an insertion hole 39a in which the second movable mold 41 is inserted for advance and retraction. The raised part 37a of the stationary mold 37 is movably inserted in the lower end of the insertion hole 39a of the first movable mold 39. Reference numeral 37b denotes a resin passage and reference numeral 39b denotes a through hole into which a support member 31 is inserted.

In the case of Embodiment 3, where expansion molding takes place, the first movable mold 39 and the second movable mold 41 are both retracted in the directions A1 and A2 of the mold opening (see FIG. 14) to enlarge the cavity volume, thereby expanding the thermoplastic resin R. In the retraction, the second movable mold 41 is retracted farther than the first movable mold 39 so that the reinforcing members 24 can be located substantially in the middle of the height of the enlarged cavity volume. The timings of actuation of the first and second movable molds 39 and 41 may coincide or one may precede the other. The other manufacturing steps are the same as in Embodiment 1 and, therefore, a description thereof is not given.

The package tray 13 thus produced has three inner ribs 23 (reinforcing members 24) located in the expanded layer 21 slightly apart from the opposed surfaces 17, 17. Also in this embodiment, the same effects as in Embodiment 1 can be obtained.

Also in Embodiment 3, like Embodiments 1 and 2, the molding retention parts 27b may be provided to support the reinforcing members 24 in the cavity 35 when the mold assembly 29 is closed. In this case, when the first and second movable molds 39 and 41 are retracted for expansion molding, all the molding retention parts 27b are released from the reinforcing members 24.

Further, in Embodiments 1 and 2, the length of extension of the molding retention parts 27b of the stationary and movable molds 25 and 27 may be selected so that when the mold assembly 29 is closed, the clearance between the each end surface of the reinforcing member 24 in the thickness direction of the package tray 13 and the opposed one of the molding surfaces of the stationary and movable molds 25 and 27 can be larger than the sum of the thickness of the portion of the skin layer 19 at the surface 17 and the thickness of the end wall of the inner rib 23 in the thickness direction of the package tray 13. Thus, like Embodiment 3, the inner ribs 23 can be formed in the middle of the thickness of the package tray 13 without continuing out to the surfaces 17.

In each of the above embodiments, only one longitudinal end of each inner rib 23 may be continued out to the portion of the skin layer 19 located at the one side 15 of the package tray 13. In this case, the inner rib 23 is also continued out to at least the portion of the skin layer 19 located at one of the opposed surface 17 of the package tray 13 to provide rigidity.

Though each of the above embodiments describes the case where the resin panel is applied to the package tray 13 for a hatchback car, the resin panel is applicable to car panels including trunk boards, floor panels and inner side panels or various panels other than car panels, such as panels for electrical appliances.

In each of the above embodiments, the expanded layer 21 is formed using spring-back of fibers. However, a foaming agent may be contained in fiber-contained thermoplastic resin. In this case, it is preferable if the movable mold 27 or the first and second movable molds 39 and 41 are retracted farther to increase the thickness of the resin in the direction of retraction of the movable mold. The reason is that even the lack of the restoring force (expansion pressure) of fibers due to spring-back can be compensated for by the foaming force (expansion pressure) of the foaming agent, thereby surely forming voids. Alternatively, depending upon applications or purposes, the expanded layer can be formed not using a thermoplastic resin containing fibers and a foaming agent but using a thermoplastic resin containing only a foaming agent. In these cases, foaming agents used include chemical foaming agents producing gas by chemical reaction and physical foaming agents using inactive gas such as carbon dioxide gas or nitrogen gas.

What is claimed is:

1. An automobile resin panel comprising:
a skin layer formed of a thermoplastic resin on sides along a direction of the panel thickness and both surfaces thereof wherein said surfaces are orthogonal to the sides; and
an expanded layer formed in an inner part thereof surrounded by the skin layer to have a multiplicity of voids,
wherein an elongate inner plate reinforcing member extending along the panel surfaces facing each other and having both end surfaces which are in contact with the both surfaces of the skin layer in the direction of the panel thickness is inserted in the expanded layer from one of the panel sides to another of the panel sides facing the one of the panel sides such that at least one part of one longitudinal end surface of the reinforcing member is exposed from one of the panel sides, both side surfaces of the reinforcing member along the direction of the panel thickness are covered with an inner rib formed of the solid layer, the inner rib is formed such that both end surfaces of the inner rib in the direction of panel thickness are seamless and continuous with the both surfaces of the skin layer facing each other, and both longitudinal ends of the reinforcing member are seamless and continuous with the skin layer at both of the panel sides, an entirety of both end surfaces of the plate reinforcing member is in contact with the both surfaces of the skin layer, and the inner rib formed of the solid layer is continuous with the both surfaces of the skin layer, and is continuous with a side of the panel sides located at both longitudinal ends of the reinforcing member.

* * * * *